Figure 1:
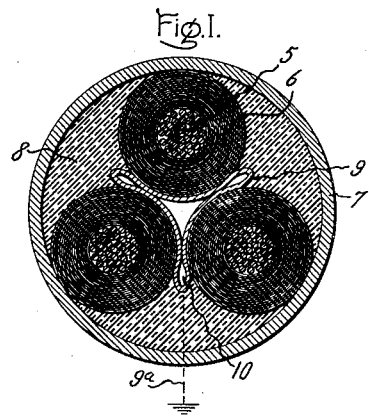

March 6, 1934.                E. KIRCH                1,950,182

MULTIPLE CONDUCTOR CABLE

Filed Dec. 13, 1932

Inventor:
Ernst Kirch,
by Charles E. Tuller
His Attorney.

Patented Mar. 6, 1934

1,950,182

UNITED STATES PATENT OFFICE 1,950,182

MULTIPLE CONDUCTOR CABLE

Ernst Kirch, Berlin-Oberschoneweide, Germany, assignor to General Electric Company, a corporation of New York Application December 13, 1932, Serial No. 647,027
In Germany December 12, 1931

3 Claims. (Cl. 173—266)

Multiplier conductor cables in which each core has its own sheath have a certain essential advantage in service, for when a fault develops in the insulation of one core or phase, i. e., leakage to earth, the protective action of the lead sheaths prevents for a long period of time the insulation of an adjacent core or phase from being damaged and therefore prevents a short circuit between two cores or phases. A cut-out of the cable may thus be effected within proper time, and any short circuit prevented, by the suitable setting of an earth leakage relay. This circumstance is of great importance for reasons of upkeep, because short circuits may cause extensive destruction in the cable and may frequently be the cause of further breakdowns in the supply system. In contradistinction to this, a short circuit may happen just as readily as a leakage to earth in ordinary three phase cables with insulated cores twisted together. In cables provided with belt insulation the probability of short circuit is even greater than that of leakage to earth. In cables having cores covered with thin metal foil or metalized paper, this metal covering exerts a certain protective action against the propagation of a fault to the adjacent cores, but the action is of course far less certain than that of thicker metal layers, as is the case with the three-sheath type of cable above referred to. Moreover, in the opinion of some engineers, the protection afforded by thin metal foil or metallized paper is wholly inadequate for this purpose.

There are circumstances in which it is desirable to retain the common lead sheath and my invention relates to an arrangement which in this type of cable makes it just as difficult for an earth leakage to lead to a short circuit, as is the case in the aforesaid three-sheath type of cable. To this end, and according to my invention, a metal screen is disposed between the cores or phases and comprises a hollow metal element shaped, either initially or by the twisting operation of the cores, to form between the cores of the finished cable a hard and non-compressible insertion preventing a direct transition of current from core to core, but on the contrary conveying leakage currents to ground. The hollow metal element contained in the cable is earthed or grounded by being conductively connected to the lead sheath of the said cable. It is necessary that the diameter and the wall thickness of this hollow metal element, made for example of lead, be suited to the service conditions and to the protective effect to be obtained. For example, when earth compensating means are provided the lead cross section may without disadvantage be considerably smaller than when the supply system has none of these means.

Figure 2:
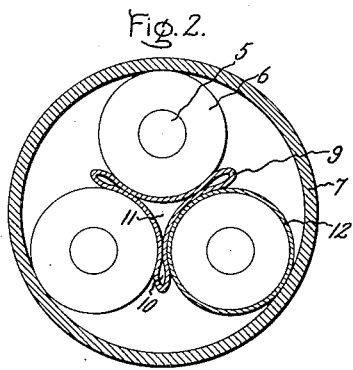
Figure 3:
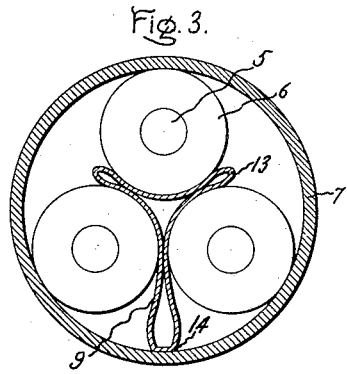
Figure 4:
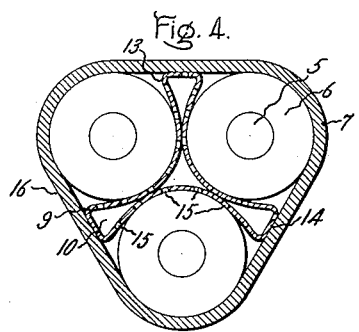

In the accompanying drawing which is illustrative of my invention, Fig. 1 is a cross section of a three-conductor cable having a symmetrically arranged hollow metal element between cores, and Figs. 2, 3 and 4 are similar views illustrating modifications.

5 indicates a stranded electric conductor and 6 the insulation therefor, such as tightly wrapped paper or equivalent material, and forming a core. Three such conductors or cores are provided and enclosing them is an imperforate sheath 7 of lead or other metal. The so-called filler spaces contain insulation 8 of any suitable character such as jute, paper or equivalent material. Inserted between the cores, in such manner as to cover substantially the same peripheral surface of each, is a hollow metallic element 9 which is insulated from the sheath 7 along its length, but may be conductively connected thereto at the joint casings or it may be connected to the sheath at other suitable points. The hollow element 9 may be made of relatively thin lead and is inserted between the cores during the cabling operation. It may initially be given the shape shown or a different one, but in any event it will take the one illustrated when centrally positioned and subjected to the pressure exerted on the sides thereof by the cores. Because the element is hollow, it may advantageously be utilized as a channel to convey an insulating fluid, such as oil or other insulating liquid or compound. When so used, the walls of the element should be perforated at suitable intervals to permit the fluid to permeate the insulation. Suitable perforations are illustrated in Fig. 4. The hollow element is centrally located with respect to the cores and the sheath. The side walls of the element cover a substantial portion of the surface area of each of the cores. The portions of the wall projecting between each pair of cores are in contact and thus afford an unyielding support for the cores at this point or region. Because the ends of the projections or portions of the element extend beyond the cores, they form spaces or channels 10 for oil or other liquid, which are additional to the center channel 11. As previously stated the hollow element is grounded as at the joints. For simplicity of illustration this ground connection is indicated by the dotted line 9ª.

In Fig. 2 is shown an arrangement whereby the hollow metallic element 9 may be connected at intervals over its entire length to the sheath 7. The element is constructed and arranged the same as before, and in addition the factory-applied insulation on one of the cores is covered by a helically wrapped band 12 of wire or thin strip metal. The band is in electrical contact with the lead sheath at intervals and also with the hollow element 9 so that in the event of any leakage through the insulation, a good conducting path to ground is provided therefor. In winding the band 12 considerable space may be left between adjacent turns, for in any event the path to ground will be a very short one.

In Fig. 3 is shown a further modification in which the hollow element 9 instead of having three legs, extensions or projections 13 of equal length has two of the same or substantially the same length, and a third of substantially greater length which is in direct electrical contact with the inner wall of the sheath 7. The outer end 14 of this leg is enlarged to afford a good contact with the sheath.

In Fig. 4 is shown a further modification in which the hollow element 9 has 3 legs 13 of equal length, each making electrical contact with the inner wall of the sheath. In this figure, the outer end 14 of each of the legs is enlarged so as to afford a relatively large contact surface with the sheath, which enlargement also forms a channel or conduit 10 for oil or compound. In this figure the walls of the shielding element have perforations 15, which may be considered as illustrating a suitable arrangement for the cables illustrated in the other figures when it is desired to use the elements as conduits in addition to shields. In Fig. 4, the sheath 7 is of triangular form and the ends of the legs of the hollow element form equally spaced supports to limit the inward movements of the flat sides 16 thereof.

With my invention, the same advantages as in a three-conductor cable are secured with two-conductor and other multiple conductor cables irrespective of whether the cable is belted or not, whether the cores are metal covered or otherwise and whether the cross section of each conductor and its insulation is segmental or circular.

The constructions of the cables described in addition to other features are distinguished from the known expansible cables by the feature that the insertions are not compressible in the finished cable, but on the contrary are incompressible and that in any case to obtain the desired effect the insertions or elements must be earthed or grounded at certain points of the cable or over the entire length thereof.

Not only does the construction described result in effective phase or core isolation, but it also affords a suitable conduit for the liquid filling of the cable and one which while it occupies only a very limited amount of space is of ample cross-section for the liquid so that the latter can move with very little resistance. By extending the legs of the hollow element to the inner wall of the sheath, whether the latter be round or of triangular shape, said legs form a mechanical support for the sheath. As the hollow element is inserted in place during the cabling operation, meaning thereby the twisting or laying of the cores similar to that in the formation of rope, it will not adversely affect the bending qualities of the cable such as are incident to reeling, unreeling and installing in conduits. The fact that each two side walls of the hollow element at the point or region where they pass between each pair of cores are in contact means that they are incompressible at these points or regions, and hence the respective positions of the cores remain unchanged during the bending and straightening of the cable as a whole.

What I claim as new and desire to secure by Letters Patent of the United States is:

1. A multiple conductor cable comprising insulated cores, a metal enclosing sheath, a phase isolating element comprising a hollow body of metal of triangular shape in cross section centrally located with respect to the cores and having its side walls in engagement with the cores for a substantial portion of their circumference, each pair of adjacent walls being in firm contact for a portion of their longitudinal surface, thereby affording a non-yielding mutual support for said cores, the ends of each pair of adjacent walls being closed and defining open passages, and a filling liquid for said passages and also for the central portion of said body.

2. A multiple conductor cable comprising insulated cores, a metal enclosing sheath, a grounded phase isolating element comprising a unitary hollow, rigid noncompressible body of metal centrally located with respect to the cores, said body having radial portions projecting outwardly from the center and located between adjacent pairs of cores, the walls of each portion being in contact in the region where pressure is exerted thereon by the cores, said walls being smooth and defining passages for liquid on both sides of said contact region, and a filling of liquid for the passages.

3. A multiple conductor cable comprising insulated cores, an enclosing sheath, and a phase isolating element extending longitudinally of the cable, said element comprising a unitary hollow metal body located centrally of the cores and sheath and having radial walls extending between each pair of cores to the inner wall of the sheath, said walls being in contact in the region of the cores and in spaced relation outside of said region, and connected at their outer ends to form a supporting seat for the sheath.

ERNST KIRCH.